(12) United States Patent
Adema

(10) Patent No.: US 12,253,669 B2
(45) Date of Patent: Mar. 18, 2025

(54) TIME-SEQUENTIAL MEMS PROJECTOR

(71) Applicant: GOOGLE LLC, Mountain View, CA (US)

(72) Inventor: Daniel Adema, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 583 days.

(21) Appl. No.: 17/530,782

(22) Filed: Nov. 19, 2021

(65) Prior Publication Data

US 2022/0163790 A1 May 26, 2022

Related U.S. Application Data

(60) Provisional application No. 63/116,341, filed on Nov. 20, 2020.

(51) Int. Cl.
*G02B 26/10* (2006.01)
*G02B 26/08* (2006.01)
*G02B 27/01* (2006.01)

(52) U.S. Cl.
CPC ....... *G02B 26/105* (2013.01); *G02B 26/0833* (2013.01); *G02B 27/0172* (2013.01)

(58) Field of Classification Search
CPC ............. G02B 26/105; G02B 26/0833; G02B 27/0172
See application file for complete search history.

(56) References Cited

U.S. PATENT DOCUMENTS

| | | | |
|---|---|---|---|
| 6,776,492 B1 * | 8/2004 | Chang | G02B 26/0816 359/850 |
| 10,976,811 B2 * | 4/2021 | Cirucci | G06F 3/013 |
| 11,924,401 B2 * | 3/2024 | Chen | H04N 13/365 |
| 2018/0082644 A1 * | 3/2018 | Bohn | G02B 6/003 |

* cited by examiner

*Primary Examiner* — Wyatt A Stoffa
*Assistant Examiner* — Seth D Moser

(57) ABSTRACT

A display system employs multiple micro-electromechanical system (MEMS) mirrors in series to receive collimated light and direct the light to provide light having input angles corresponding to a desired field of view at a point or line at an incoupler (IC) of a waveguide without an optical relay. An initial one or more MEMS mirrors accepts collimated light and generates the scan angles. A last MEMS mirror in the series scans at a range of angles proportional to the scan angles generated by the initial MEMS mirror(s) and directs the scanned light back to a spot or a line at the IC.

12 Claims, 13 Drawing Sheets

TIME-SEQUENTIAL MEMS PROJECTOR

BACKGROUND

Some display systems employ a projector, which is an optical device that projects or shines a pattern of light onto another object (e.g., onto a surface of another object, such as onto a projection screen) to display an image or video on or via that other object. In projectors employing lasers as light sources (i.e., a "laser projector"), each beam of laser light generated by the laser projector is temporally modulated to provide a pattern of laser light and controllable mirrors, such as micro-electromechanical system (MEMS) mirrors rotatable about a single axis (1-D) or about two axes (2-D), are typically used to focus the modulated pattern of laser light at a point on another object or to spatially distribute the modulated pattern of laser light over a two-dimensional area of another object. The angle of incidence or spatial distribution of the modulated pattern of laser light produces an image at the other object.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
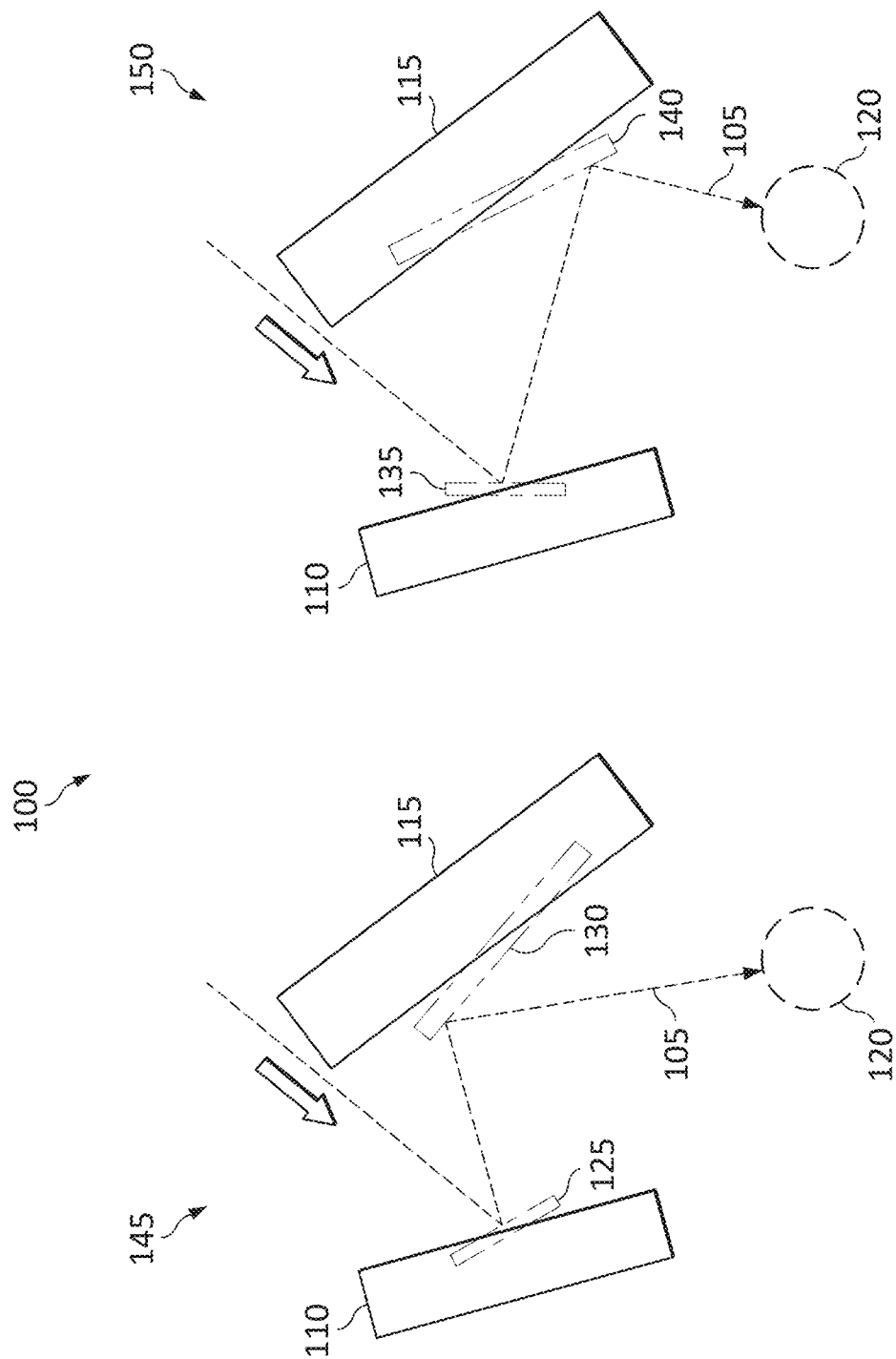
FIG. 1 is a diagram illustrating a display system including two 2-D MEMS mirrors in series to provide input angles for light to an incoupler of a waveguide independent of an optical relay in accordance with some embodiments.

Near-eye display systems (such as wearable heads-up displays (WHUDs)) typically include a modulatable light source such as one or more lasers, one or more MEMS mirrors, an optical relay, and a waveguide. Each of the MEMS mirrors receives light output from the light source in series, and each MEMS mirror scans the light over a range of angles to direct the light in a respective direction. The optical relay receives the scanned light from an initial MEMS mirror and introduces a convergence to the light (e.g., via collimation) to focus the light to a point or a line at an exit pupil plane of the optical relay beyond a second MEMS mirror. The second MEMS mirror receives the focused light and scans the light in a direction orthogonal to the direction of light scanned by the initial MEMS mirror to a point or line at an incoupler (IC) of the waveguide. The optical relay enables the MEMS mirrors to be physically separated from the IC to route light onto the MEMS mirrors and into the IC. The incoupler receives the light over a range of input angles, and the light propagates through the waveguide within angles acceptable to achieve total internal reflection (TIR) within the waveguide. The light exits the waveguide at an outcoupler so that the light is projected onto the eye of a user.

However, the optical relay enlarges the footprint of the display system and typically introduces errors into the light path. The optical relay generally includes one or more spherical, aspheric, parabolic, or freeform lenses that receive input light at a given set of angles (which are typically diverging from each other) and output light at a different set of angles (which are typically converging to a point or line). Any of the lenses of the optical relay may contain aberrations that distort the light path. Although aberrations can be minimized by enlarging the lenses, maintaining a compact form factor is an important design consideration for near-eye display systems.

FIGS. 1-13 illustrate embodiments of a near-eye display system that employs multiple MEMS mirrors in series to receive collimated light and direct the light to provide light having input angles corresponding to a desired field of view at a point or line at an incoupler (IC) of a waveguide without an optical relay. An initial one or more MEMS mirrors accepts collimated light and generates the scan angles. A last MEMS mirror in the series scans at a range of angles proportional to the scan angles generated by the initial MEMS mirror(s) and directs the scanned light back to a spot or a line at the IC. By eliminating the optical relay and replacing it with MEMS mirrors, the light reflects only off planar surfaces, improving the optical performance of the display system compared to a display system employing an optical relay.

In some embodiments, the display system includes two 2-D MEMS mirrors in series. The first 2-D MEMS mirror rotates about two axes and thus has two degrees of freedom (DOF). The first 2-D MEMS mirror receives collimated light from a light source such as one or more lasers and scans the light to the second 2-D MEMS mirror. The second 2-D MEMS mirror receives the scanned light from the first 2-D MEMS mirror and scans the light to a point at the IC. The scan angles of the first and second 2-D MEMS mirrors are a function of the desired field of view (i.e., range of angles of incident light) at the IC, the distance between the first and second 2-D MEMS mirrors, and the distance from the second MEMS mirror to the IC. In some embodiments, the first and second 2-D MEMS mirrors are arranged to be coplanar, thus simplifying their mechanical alignment and electrical connections.

In other embodiments, the display system includes one 1-D MEMS mirror and one 2-D MEMS mirror in series. The 1-D MEMS mirror rotates about a single axis and thus has one DOF. The 1-D MEMS mirror receives collimated light from the light source and scans the light to the 2-D MEMS mirror. The 2-D MEMS mirror receives the scanned light from the 1-D MEMS mirror and scans the light to a line at the IC.

In some embodiments, the display system includes three 1-D MEMS mirrors in series. The first 1-D MEMS mirror rotates about a first axis and has one DOF. The first 1-D MEMS mirror receives collimated light from the light source and scans the light to the second 1-D MEMS mirror. The second 1-D MEMS mirror rotates about a second axis orthogonal to the first axis and has one DOF. The second 1-D MEMS mirror receives scanned light from the first 1-D MEMS mirror and scans the light to the third 1-D MEMS mirror. The third 1-D MEMS mirror rotates about a third axis orthogonal to the first and second axes and has one DOF. The third 1-D MEMS mirror receives scanned light from the second 1-D MEMS mirror and scans the light to a line at the IC.

Thus, to converge the light to a line (i.e., to correct for the divergence of light along one axis), the display system employs one 1-D MEMS mirror and one 2-D MEMS mirror in some embodiments, or three 1-D MEMS mirrors, in other embodiments, with a total of three degrees of freedom. Applications for line inputs to an incoupler of a waveguide are described in U.S. patent application Ser. No. 17/204,308, entitled "Systems, Devices, and Methods for Inputting Light from a Scanning Laser Projector Into a Waveguide", filed Mar. 17, 2021, the entire disclosure of which is expressly incorporated by reference herein. To converge the light to a point (i.e., to correct for the divergence of light along two axes), the display system employs two 2-D MEMS mirrors, with a total of four degrees of freedom.

FIG. 1 is a diagram illustrating two views 145, 150 of a display system 100 including two 2-D MEMS mirrors 110, 115 in series to provide input angles for light to an IC 120 of a waveguide (not shown) independent of an optical relay in accordance with some embodiments. The first 2-D MEMS mirror 110 receives collimated light 105 (referred to herein as light 105) generated by a light engine (not shown) including one or more laser diodes (not shown). The first 2-D MEMS mirror 110 rotates about two axes (e.g., about a first axis in a first plane and a second axis in a second plane orthogonal to the first plane), from a first orientation 125 shown in the view 145 to a second orientation 135 shown in the view 150, to scan the light 105 reflected off the first 2-D MEMS mirror 110 across a first range of angles to the second MEMS mirror 115.

The second 2-D MEMS mirror 115 receives the light 105 reflected off the first 2-D MEMS mirror 110 and rotates about two axes, from a first orientation 130 shown in the view 145 to a second orientation 140 shown in the view 150, to scan the light 105 reflected off the second 2-D MEMS mirror 115 across a second range of angles to a point at the IC 120. The second range of angles through which the second 2-D MEMS mirror 115 rotates compensates for the first range of angles through which the first 2-D MEMS mirror 110 rotates such that the incident light 105 now interacts with the IC 120 over a range of angles, but only at a single spot. By rotating about their respective axes to steer the light 105 to intersect at a point at the IC 120, the first and second 2-D MEMS mirrors 110, 115 generate angles of the incident light 105 that determine a FOV at the IC 120 independent of an optical relay.

In some embodiments, the first 2-D MEMS mirror 110 and the second 2-D MEMS mirror 115 rotate about their respective axes at the same frequency but different phases from each other. Because light 105 received at the first 2-D MEMS mirror 110 is reflected at the angle of incidence, the second MEMS mirror 115 is larger than the first 2-D MEMS mirror 110 in some embodiments so that it is sized to receive the light 105 reflected off the first 2-D MEMS mirror 110. For example, if the first MEMS mirror 110 moves across 4 degrees, the reflected rays from the first 2-D MEMS mirror 110 will spread across 8 degrees. Thus, the second 2-D MEMS mirror 115 is larger than the first 2-D MEMS mirror 110 to accommodate the fanning out of the rays of incident light 105.

In some embodiments, both the first 2-D MEMS mirror 110 and the second 2-D MEMS mirror 115 are resonant MEMS mirrors that oscillate such that the rate of change of the angle of the mirrors has a sinusoidal shape. In other embodiments, both the first 2-D MEMS mirror 110 and the second 2-D MEMS mirror 115 are linear 2-D MEMS mirrors that have a linear rate of angular change.

Figure 2:
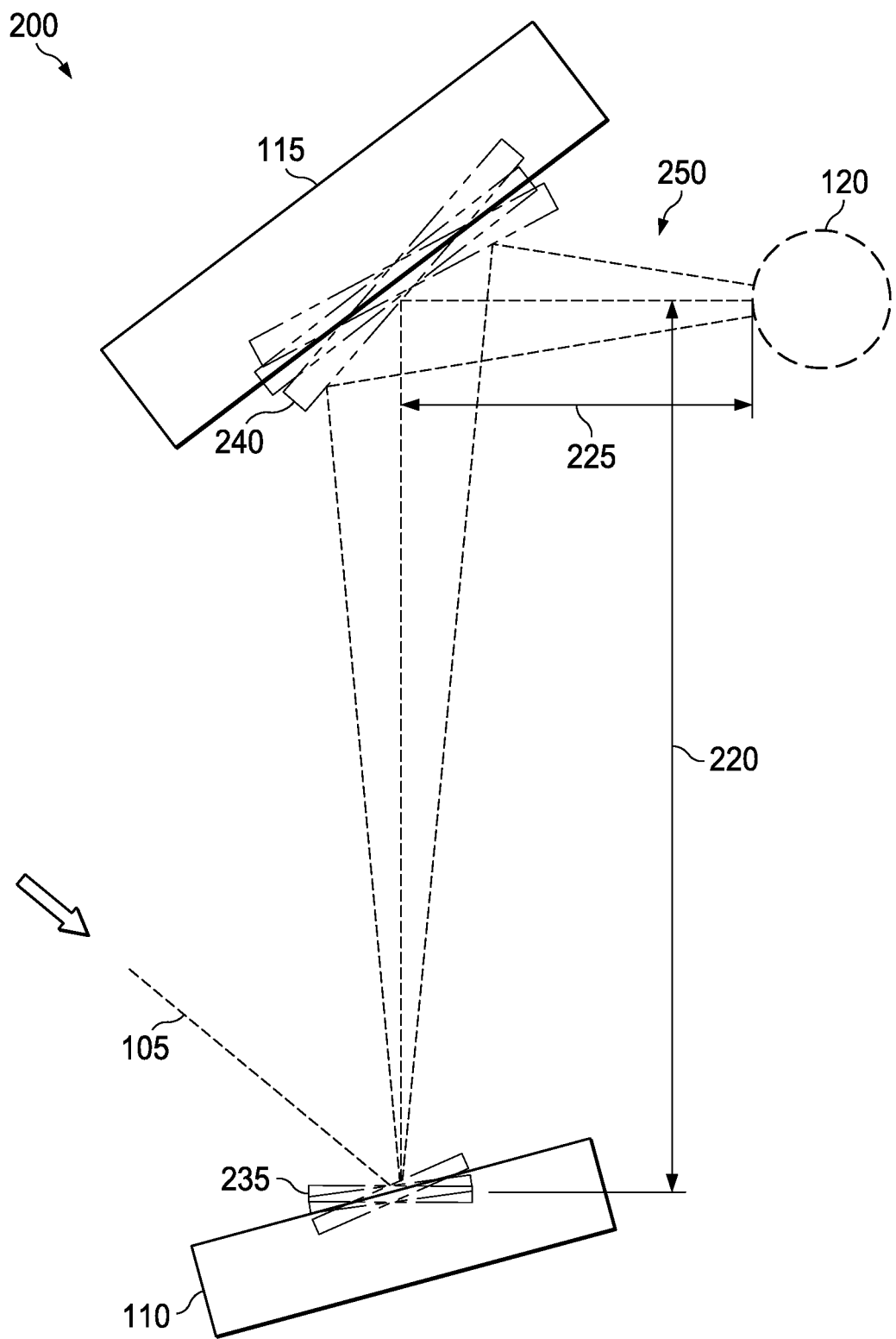
FIG. 2 is a diagram illustrating relative dimensions of the display system of FIG. 1 in accordance with some embodiments.

FIG. 2 is a diagram 200 illustrating relative dimensions of the display system 100 of FIG. 1 in accordance with some embodiments. The first 2-D MEMS mirror 110 scans light 105 across a range of angles 235 to the second 2-D MEMS mirror 115. The second 2-D MEMS mirror 115 is separated from the first 2-D MEMS mirror 110 by a distance 220. The second 2-D MEMS mirror 115 scans across a range of angles 240 that are proportional to the angles of the first 2-D MEMS 110 so that the light 105 illuminates a spot at the IC 120. The IC 120 is separated from the second 2-D MEMS mirror 115 by a distance 225. The angles 250 at which light 105 enters the IC 120 determine the FOV of the display system 100.

To achieve a desired FOV, the components of the display system 100 are configured according to the following relationships:

$$FOV = 2 \times (B-A)$$

$$B = A \times (1 + a/b)$$

if $a=b$, then $B = 2 \times A$ wherein A=the mirror angle of the first 2-D MEMS mirror 110, B=the mirror angle of the second 2-D MEMS mirror 115, a=the path length 220 between the first 2-D MEMS mirror 110 and the second 2-D MEMS mirror 115, and b=the path length 225 from the second 2-D MEMS mirror 115 to the IC 120.

The above relationships apply to any range of mirror angles. For example, several embodiments are illustrated in Table 1 below.

TABLE 1

| Parameter | Embodiment 1 | Embodiment 2 | Embodiment 3 |
|---|---|---|---|
| a (mm) | 6.0 | 10.0 | 8.0 |
| b (mm) | 3.0 | 2.5 | 2.5 |
| FOV (degrees) | 10.0 (+/−5.0) | 10.0 (+/−5.0) | 10.0 |
| mirror angle A of first 2-D MEMS 110 | +/−1.25 | +/−0.625 | +/−1.0 |
| mirror angle B of second 2-D MEMS 115 | +/−3.75 | +/−3.125 | +/−3.0 |

Figure 3:
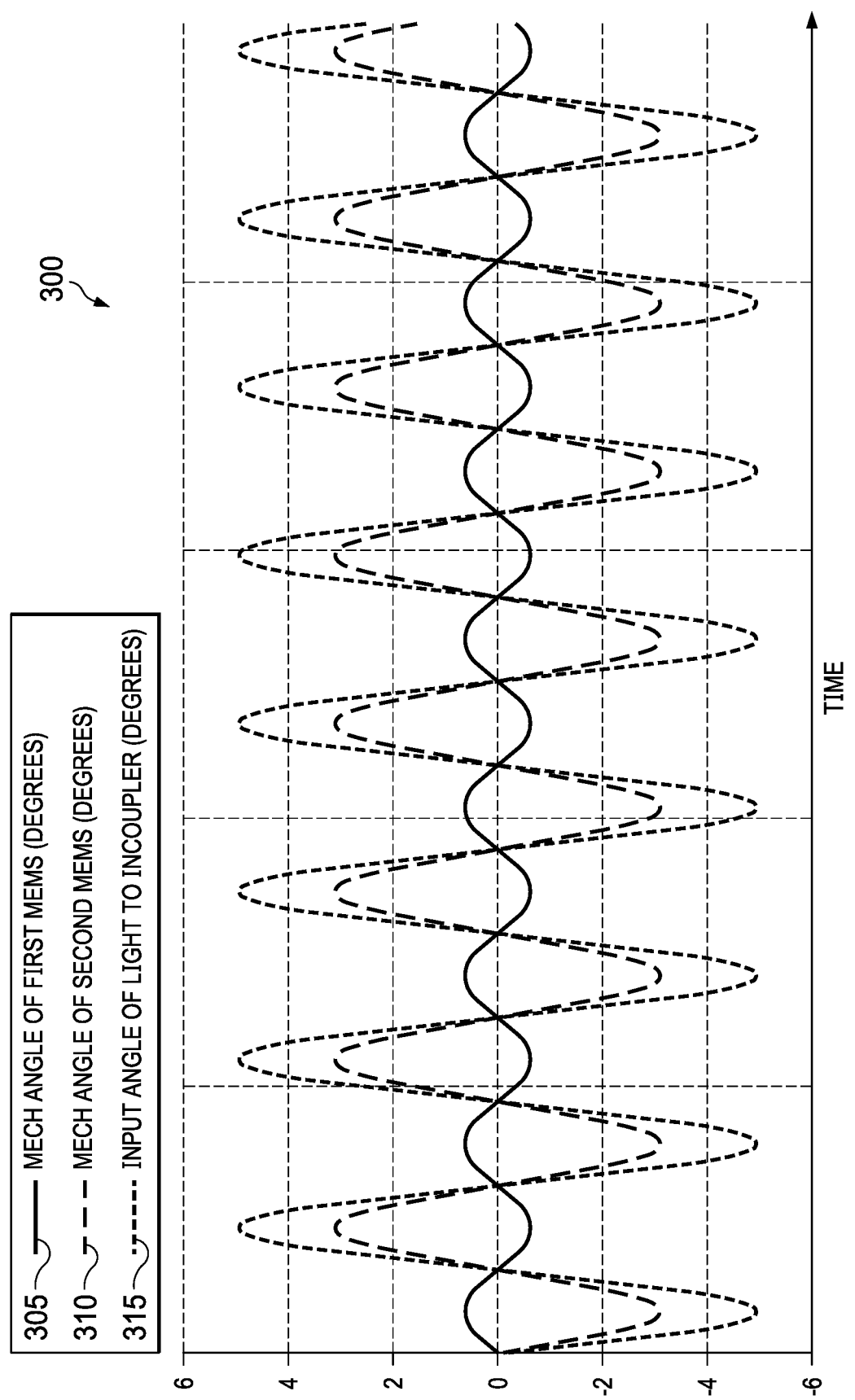
FIG. 3 is a timing diagram illustrating rotational angles of the two 2-D MEMS mirrors of the display system of FIG. 1 and the resulting input angles to the incoupler of the waveguide in accordance with some embodiments.

FIG. 3 is a timing diagram 300 illustrating rotational angles of the two 2-D MEMS mirrors 110, 115 of the display system 100 of FIG. 1 and the resulting input angles to the IC 120 in accordance with some embodiments. In the illustrated example, the first 2-D MEMS mirror 110 receives light 105 and scans across a range of angles 305 from +0.625 degrees to −0.625 degrees. The second 2-D MEMS mirror 115 receives the scanned light 105 reflected off the first 2-D MEMS mirror 110 and scans across a range of angles 310 from −3.125 degrees to +3.125 degrees. The light 105 reflects off the second 2-D MEMS mirror 115 and converges at a point on the IC 120 with input angles 315 ranging from −5.0 degrees to +5.0 degrees, resulting in a FOV of 10.0 degrees.

Figure 4:
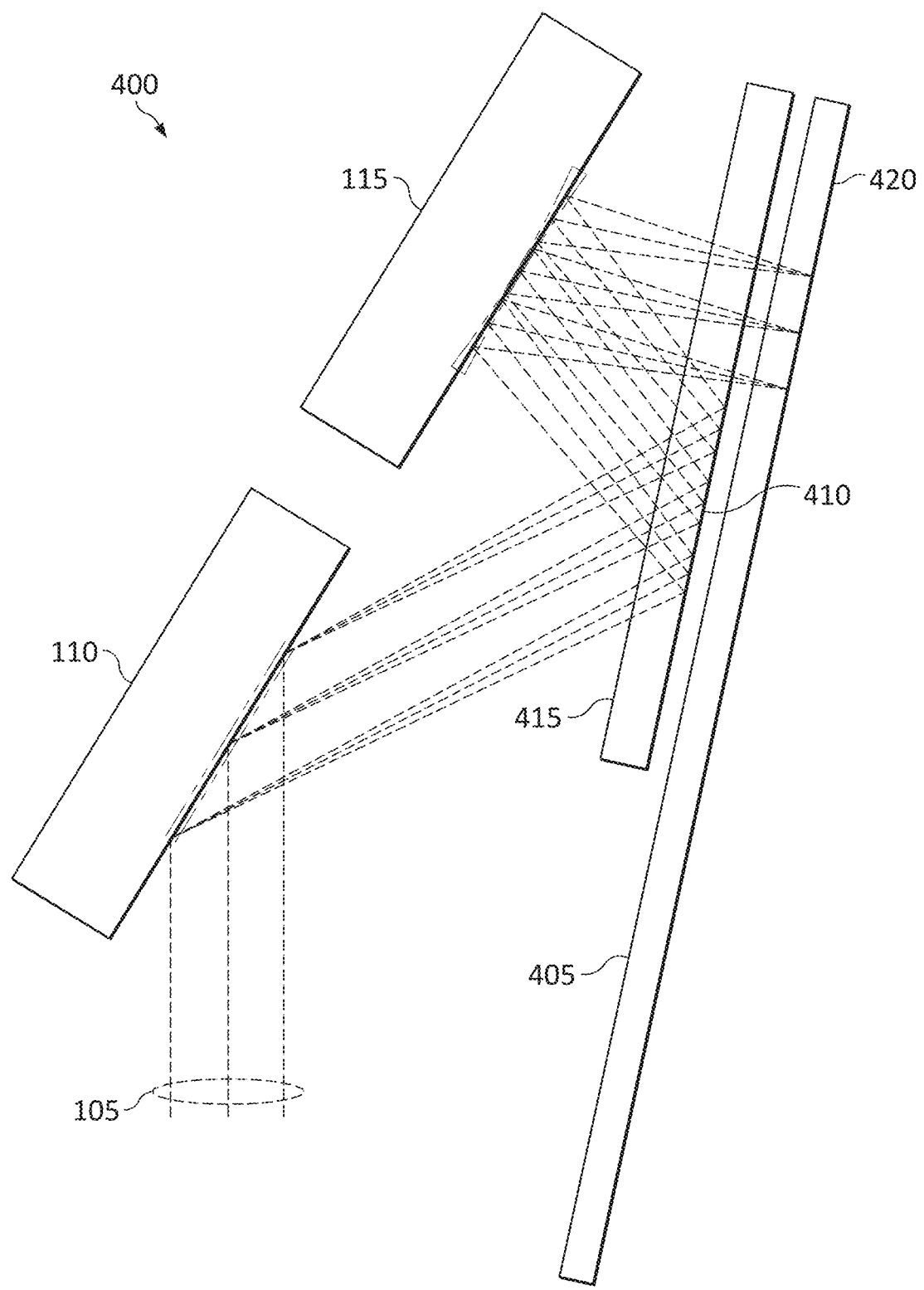
FIG. 4 is a diagram illustrating a co-planar arrangement of the two 2-D MEMS mirrors of the display system of FIG. 1 in accordance with some embodiments.

FIG. 4 is a diagram illustrating a display system 400 having a co-planar arrangement of the two 2-D MEMS mirrors 110, 115 of FIG. 1 in accordance with some embodiments. In some embodiments, the first and second 2-D MEMS mirrors 110, 115 are disposed on a common surface of a substrate (not shown), such that the first 2-D MEMS mirror 110 is substantially coplanar with respect to the second 2-D MEMS mirror 115. Such an arrangement of the first and second 2-D MEMS mirrors 110, 115 reduces the volume or form factor of the display system 100 compared to arrangements in which the first and second 2-D MEMS mirrors 110, 115 are disposed on different substrates and reduces the complexity of electrical connections between the first and second 2-D MEMS mirrors 110, 115 and associated controllers and power supplies (not shown).

In the illustrated example, a window 415 is disposed adjacent to the incoupler 120 of a waveguide 405. The first 2-D MEMS mirror 110 receives incident light 105 and scans the light 105 to a surface 410 of the window 415. The light 105 reflects off the surface 410 to the second 2-D MEMS mirror 115. The second 2-D MEMS mirror 115 scans the light 105 to a point at the incoupler 120. In some embodiments, the window 415 is omitted from the co-planar arrangement 400 of the display system 100, and instead of reflecting off the surface 410 of the window 415, the light 105 reflects off a surface 420 of the waveguide 405 opposite from the IC 120.

Figure 5:
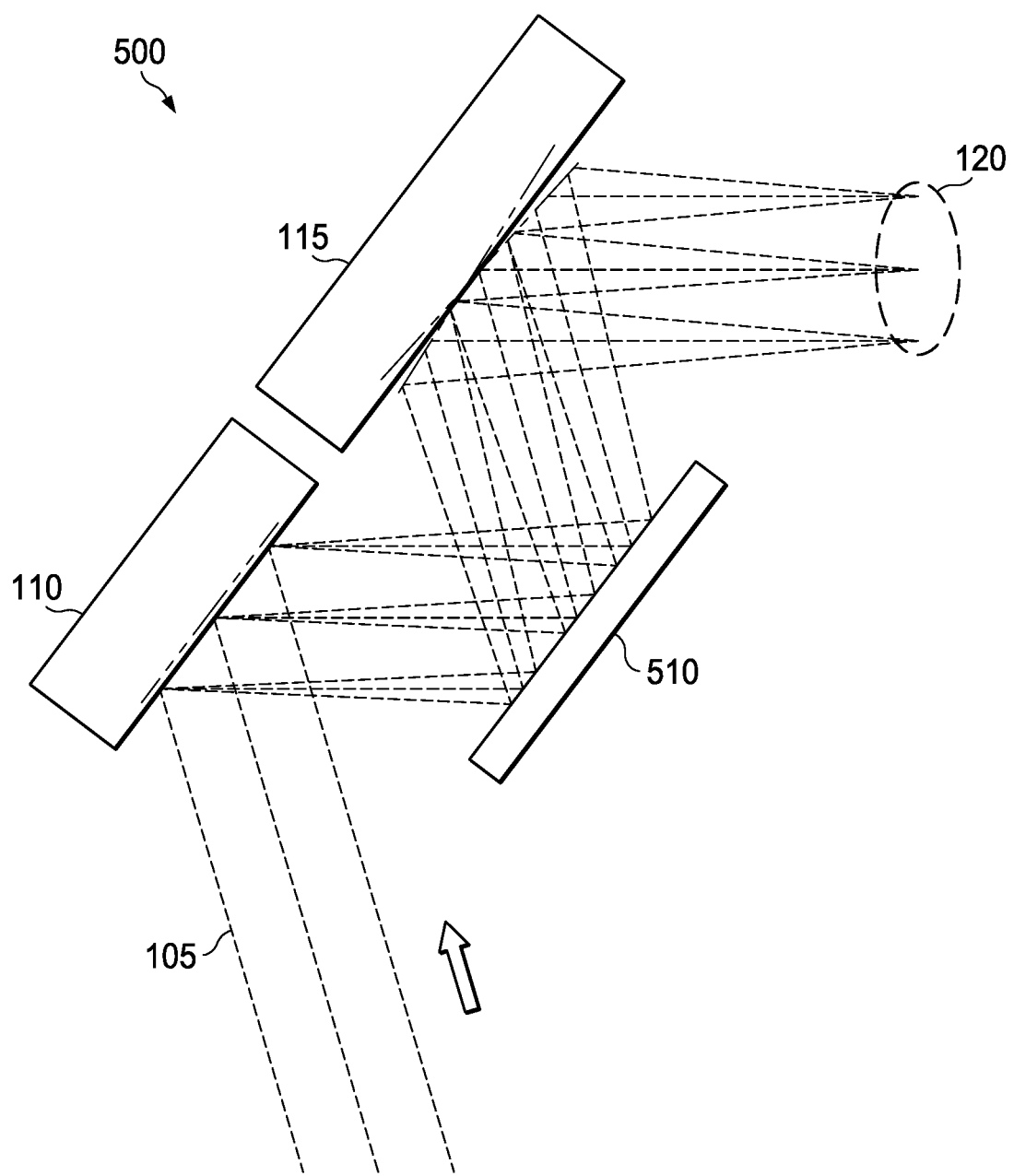
FIG. 5 is a diagram illustrating a display system including two co-planar 2-D MEMS mirrors in series with a static mirror in accordance with some embodiments.

FIG. 5 is a diagram illustrating a display system 500 including the two 2-D MEMS mirrors 110, 115 in a coplanar configuration in series with a static flat mirror 510 in accordance with some embodiments. The static flat mirror 510 is disposed opposite the two 2-D MEMS mirrors 110, 115 such that light 105 scanned from the first 2-D MEMS mirror 110 is steered to the static flat mirror 510. The light 105 reflects off the static flat mirror 510 to the second 2-D MEMS mirror 115. The second 2-D MEMS mirror 115 receives the light 105 and scans the light 105 to a point at the incoupler 120.

Figure 6:
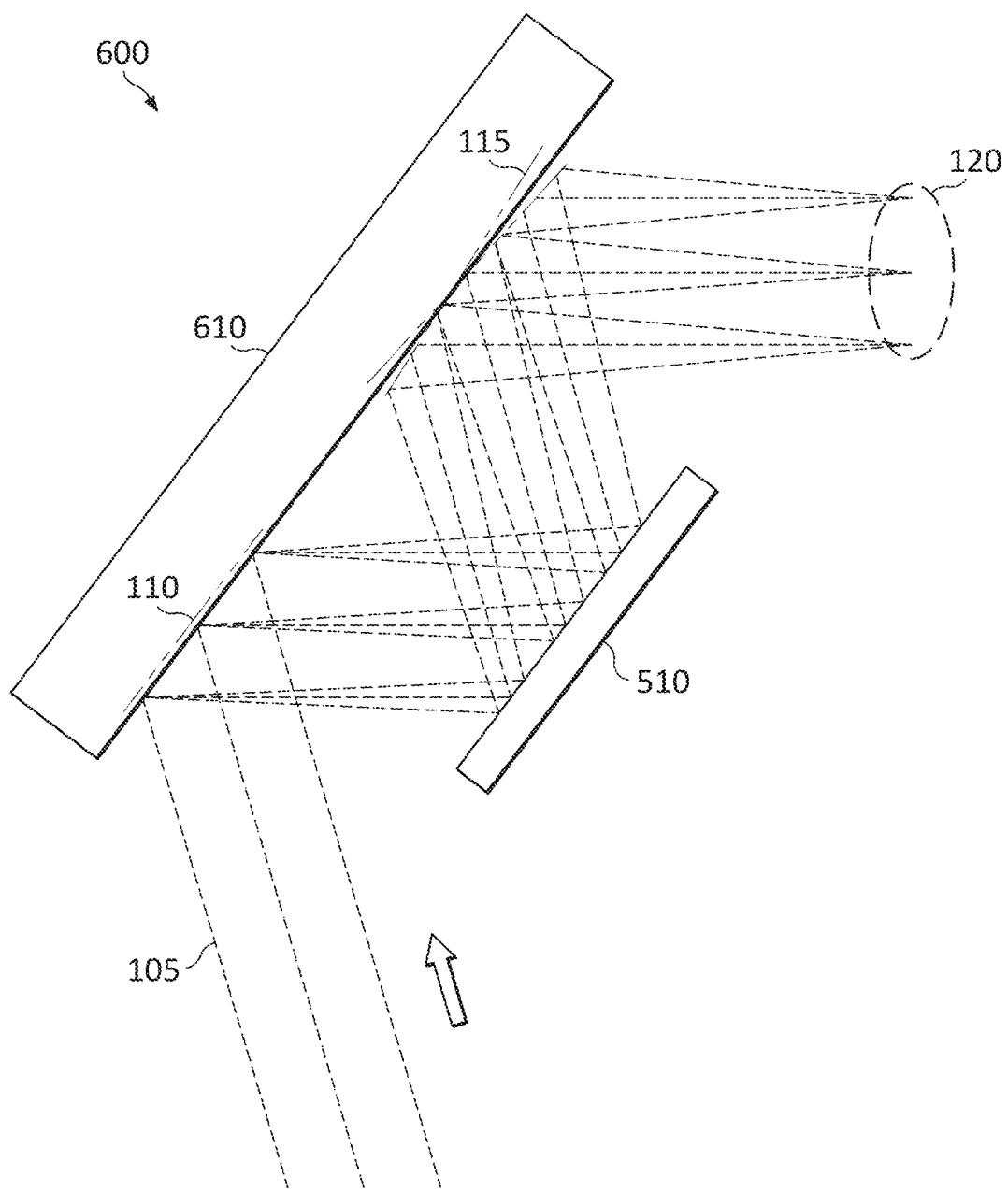
FIG. 6 is a diagram illustrating the two co-planar 2-D MEMS mirrors of the display system of FIG. 5 integrated into a single package in accordance with some embodiments.

FIG. 6 is a diagram illustrating an embodiment 600 of the display system 500 of FIG. 5, in which the two co-planar 2-D MEMS mirrors 110, 115 are integrated into a single package in accordance with some embodiments. Integrating the 2-D MEMS mirrors 110, 115 into a single package (by, e.g., mounting the 2-D MEMS mirrors 110, 115 to a single substrate 610) facilitates relative positioning and electrical connections between the 2-D MEMS mirrors 110, 115 while reducing the footprint of the display system 500. In some embodiments, the first 2-D MEMS mirror 110 and the second 2-D MEMS mirror 115 are included in a single MEMS device. In some embodiments, both the first 2-D MEMS mirror 110 and the second 2-D MEMS mirror 115 are resonant MEMS that direct the light 105 in opposite directions. For example, in an embodiment, the first 2-D MEMS mirror 110 directs the light 105 +5 degrees toward the static flat mirror 510, which reflects the light 105 to the second 2-D MEMS mirror 115. The second 2-D MEMS mirror 115 receives the light 105 from the static flat mirror 510 and turns the light 105−5 degrees to converge at a point at the IC 120.

In another embodiment, the first and second 2-D MEMS mirrors 110, 115 are both resonant and yield a line input at the IC 120. In one of the scan directions, the first and second 2-D MEMS mirrors 110, 115 direct the light 105 in opposite directions to converge the light 105 back to a point. In an orthogonal scan direction, the first and second 2-D MEMS mirrors 110, 115 scan the light 105 in the same direction such that their collective effect on the light 105 is additive. For example, in an embodiment, the first 2-D MEMS mirror 110 receives the light 105 and turns the light +2.5 degrees in the orthogonal scan direction toward the static flat mirror 510. The light 105 reflects off the static flat mirror to the second 2-D MEMS mirror 115. The second 2-D MEMS mirror 115 receives the light 105 from the static flat mirror 510 and turns the light another +2.5 degrees to result in a net angle in the orthogonal direction of +5 degrees, with the light 105 intersecting at a line at the IC 120. Because the scan angle in the orthogonal direction of the first 2-D MEMS mirror 110 is added to the scan angle in the orthogonal direction of the second 2-D MEMS mirror 115 to result in a line input at the IC 120, each of the first and second 2-D MEMS mirrors 110, 115 rotates a reduced angular distance, resulting in power savings.

Figure 7:
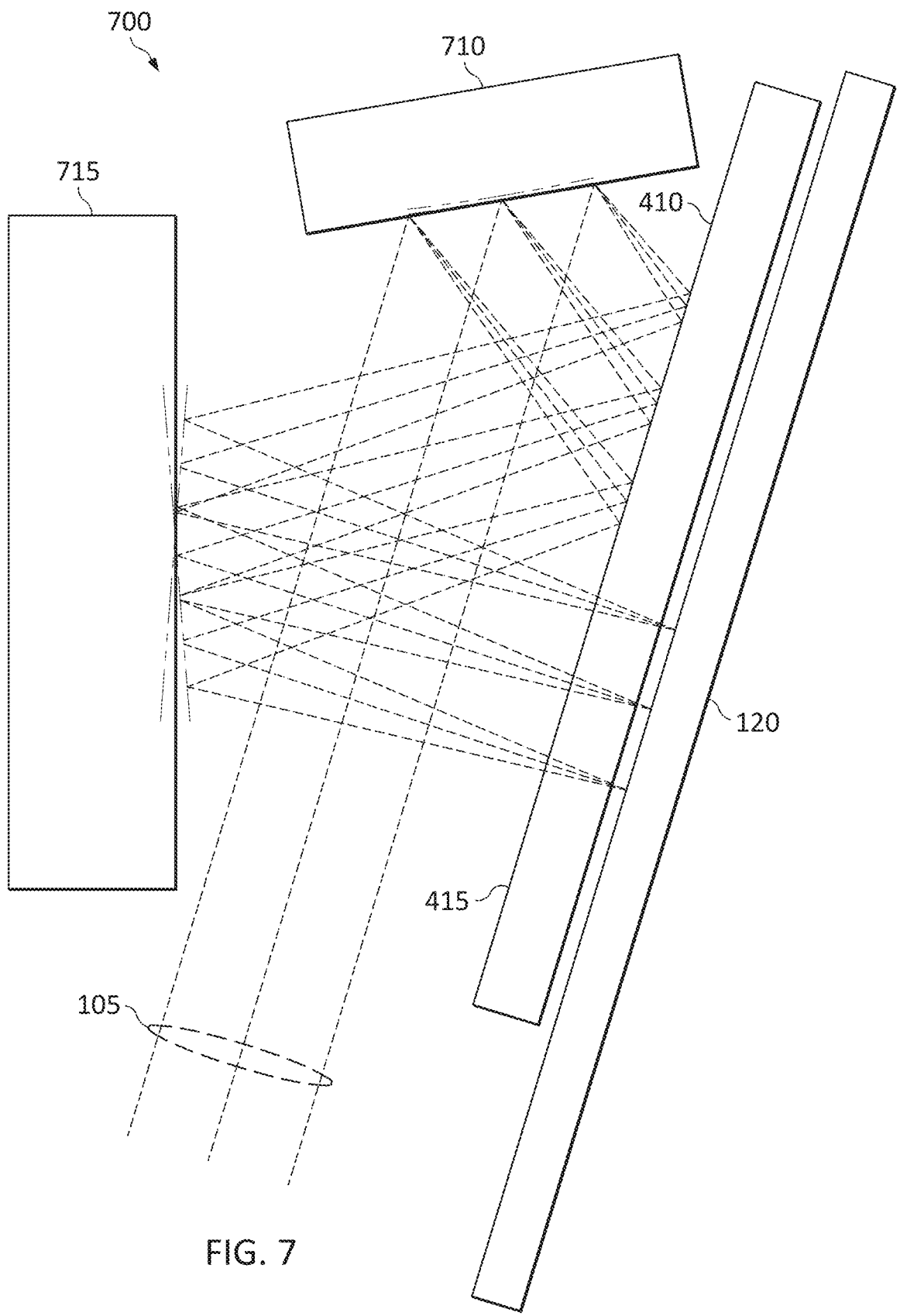
FIG. 7 is a diagram illustrating a display system including a 1-D MEMS mirror and a 2-D MEMS mirror in series to provide a horizontal linescan input to an incoupler of a waveguide independent of an optical relay in accordance with some embodiments.

FIG. 7 is a diagram illustrating a display system 700 including a 1-D MEMS mirror 710 and a 2-D MEMS mirror 715 in series to provide a linescan input to the IC 120 in/out of the page independent of an optical relay in accordance with some embodiments. The 1-D MEMS mirror 710 receives light 105 and scans the light 105 to a reflective surface 410 of a window 415. The reflective surface 410 reflects the light to the 2-D MEMS mirror 715. The 2-D MEMS mirror 715 receives the reflected light 105 and scans the light 105 to a line at the IC 120. Thus, the combination of the initial 1-D MEMS mirror 710 in series with the 2-D MEMS mirror 715, which oscillates about a first axis to receive and converge the light 105 that is spread along the first axis by the initial 1-D MEMS mirror 710 and oscillates about a second axis orthogonal to the first axis to spread the light along the orthogonal axis, forms a line input in and out of the page at the IC 120.

In some embodiments, the light path between the 1-D MEMS mirror 710 and the 2-D MEMS mirror 715 is 4.6 mm, the light path between the 2-D MEMS mirror 715 and the IC 120 is 3.0 mm, the FOV is 10 degrees, and the light 105 is a 1.0 mm beam. The 1-D MEMS mirror 710 is a resonant MEMS with a 1.0 mm aperture in some embodiments. When incorporated into an eyeglass frame, such embodiments result in a pantoscopic angle of 12.0 degrees.

In another embodiment, the 1-D MEMS mirror 710 is an elliptical mirror or the beam of light 105 is elliptical. The size of the beam of light 105 is 2.0 mm×0.8 mm, and the 1-D MEMS mirror 710 has a 2.0 mm×1.0 mm aperture, while the 2-D MEMS mirror 715 has a circular 2.0 mm aperture.

Figure 8:
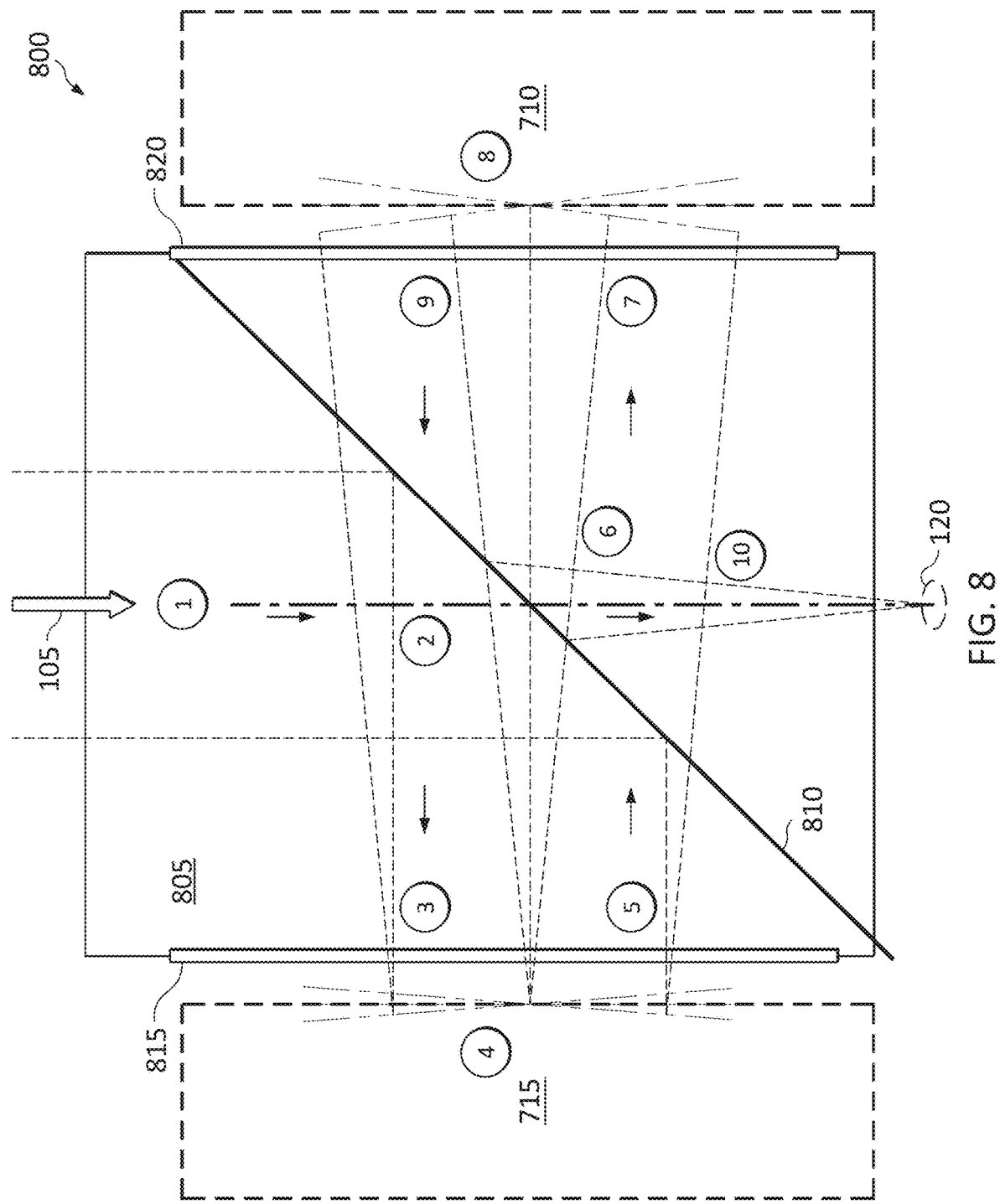
FIG. 8 is a diagram illustrating a display system including one 1-D MEMS mirror and one 2-D MEMS mirror in series transmitting light through a prism with a polarizing beam splitter and quarter waveplates to provide input angles for light to an incoupler of a waveguide independent of an optical relay in accordance with some embodiments.

FIG. 8 is a diagram illustrating a display system 800 including the 1-D MEMS mirror 710 and the 2-D MEMS mirror 715 in series transmitting light through a waveplate prism 805 with a polarizing beam splitter (PBS) 810 and quarter waveplates 815, 820 to provide input angles for light 105 in a linescan to the IC 120 of a waveguide (not shown) independent of an optical relay in accordance with some embodiments. Mounting the 1-D MEMS mirror 710 and the 2-D MEMS mirror 715 to the PBS 810 or waveplate prism 805 facilitates transmission of the light 105 through a vacuum for lower-power operation of the 1-D MEMS mirror 710 and the 2-D MEMS mirror 715.

In the illustrated embodiment, various stages of the light path are labeled 1-10. At stage "1" of the light path, the incident light 705 is S-polarized and enters the prism 805. The S-polarized light 705 reflects off the PBS 810 at stage "2" of the light path toward the quarter waveplate 815 positioned in front of the 2-D MEMS mirror 715. At stage "3" of the light path, the light 105 passing through the quarter waveplate 815 is changed to circular polarization. The circularly polarized light 105 reflects off the 2-D MEMS mirror 715 at stage "4" of the light path, which scans the light 105 to a desired range of angles.

As the light 105 passes back through the quarter waveplate 815 at stage "5" of the light path, the light 105 is changed to P-polarization. At stage "6" of the light path, the P-polarized light 105 passes through the PBS 810 toward the quarter waveplate 820 positioned in front of the 1-D MEMS mirror 710. At stage "7" of the light path, the P-polarized light 105 passing through the quarter waveplate 820 is changed to circular polarization. At stage "8" of the light path, the circularly polarized light 105 is reflected off the 1-D MEMS mirror 710, which scans the light 105 to a range of angles to direct the light 105 to a desired line at the IC 120. At stage "9" of the light path, the circularly polarized light 105 passing through the quarter waveplate 820 is changed to S-polarization. At stage "10" of the light path, the S-polarized light 105 reflects at the PBS 810 and is directed to the desired line at the IC 120.

In some embodiments, a configuration similar to that illustrated in FIG. 8 is used with two 2-D MEMS mirrors to steer the light 105 to a single spot at the IC 120. For example, by replacing the 1-D MEMS mirror 710 with a second 2-D MEMS mirror (not shown), the display system 800 directs the light 105 to a point at the IC 120 rather than a line. In other embodiments, the display system 800 is implemented with three 1-D MEMS mirrors to direct the light 105 to a horizontal line at the IC 120.

Figure 9:
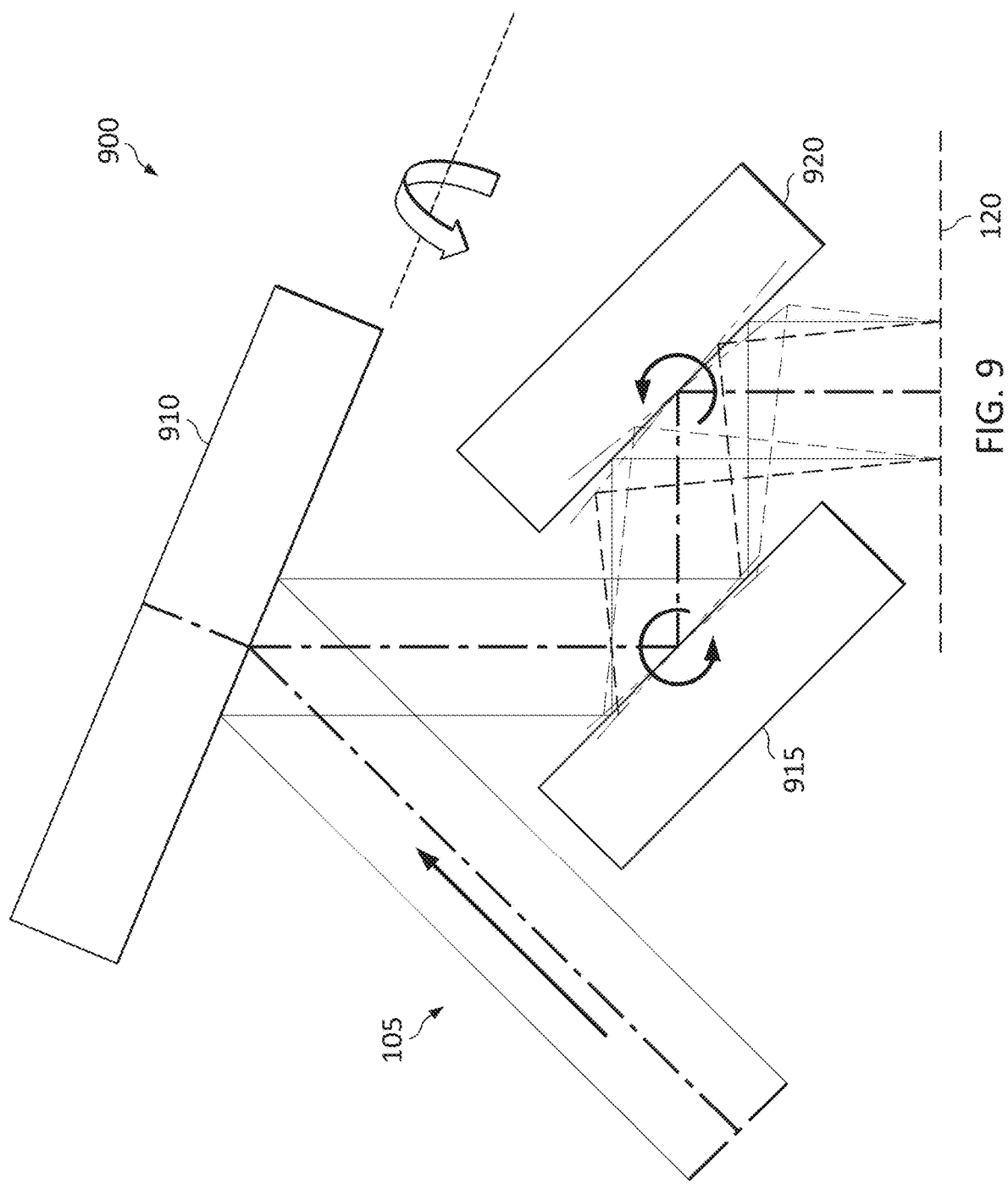
FIG. 9 is a diagram illustrating a display system including three 1-D MEMS mirrors in series to provide input angles for light to an incoupler of a waveguide independent of an optical relay in accordance with some embodiments.

FIG. 9 is a diagram illustrating a display system 900 including three 1-D MEMS mirrors 910, 915, 920 in series to provide input angles for a horizontal line input at the IC 120 of a waveguide (not shown) independent of an optical relay in accordance with some embodiments. In the illustrated example, a first (initial) 1-D MEMS mirror 910 in the series receives the light 105 and scans in and out of the page to direct the light 105 to a second (intermediate) 1-D MEMS mirror 915. The second 1-D MEMS mirror 915 receives the light 105 and scans in the plane of the page to direct the light 105 to a third (last) 1-D MEMS mirror 920. The third 1-D MEMS mirror 920 receives the light and scans in the plane of the page to direct the light 105 to a horizontal line that scans in and out of the page at the IC 120. Similar to the input to an IC from a linescan relay projector, the horizontal scanned line can be oriented perpendicular to the direction of light propagation in the waveguide (not shown) to minimize double bounce losses.

Figure 10:
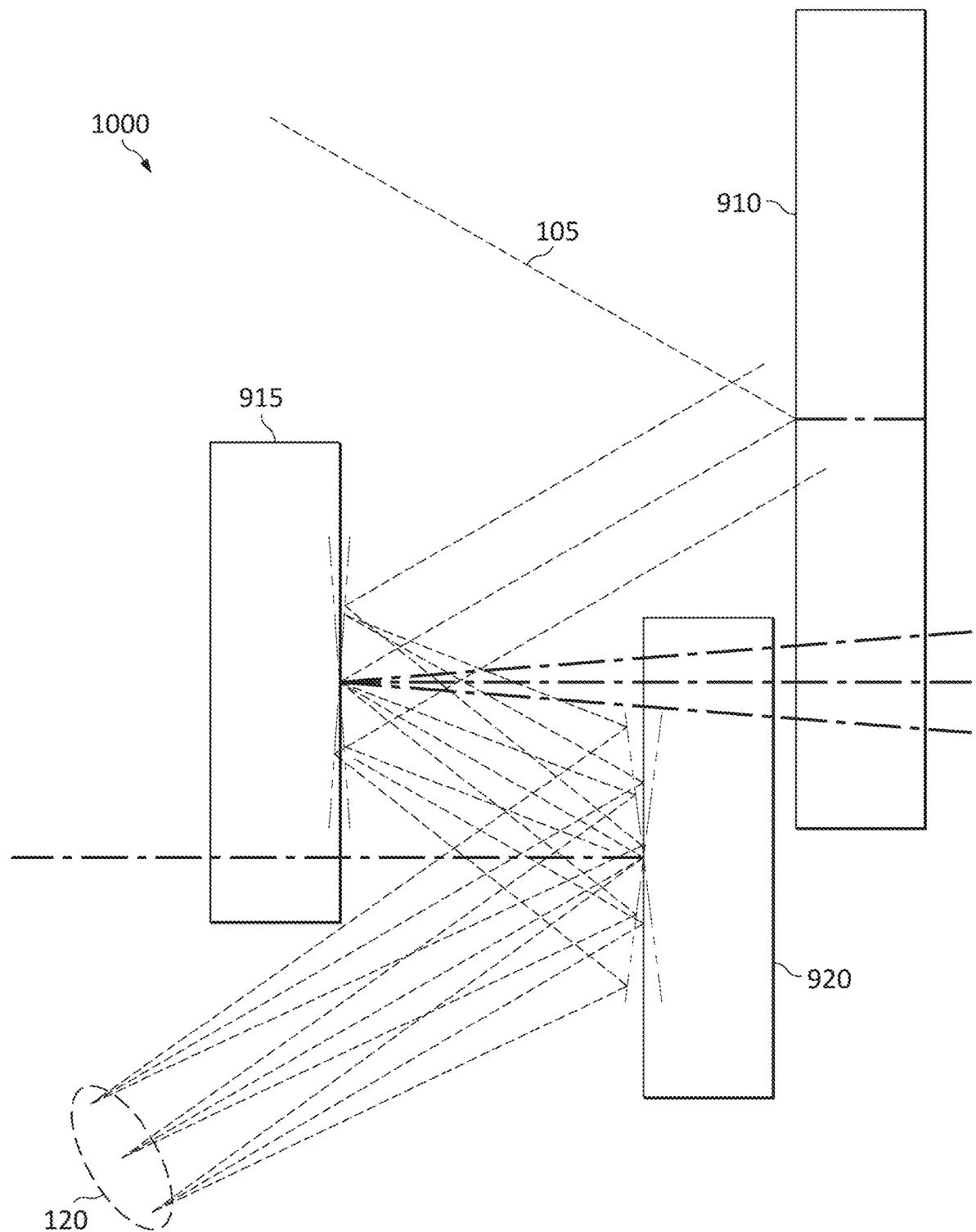
FIG. 10 is a diagram illustrating a display system including an alternative arrangement of the three 1-D MEMS mirrors of FIG. 9 in accordance with some embodiments.

FIG. 10 is a diagram illustrating a display system 1000 including an alternative arrangement of the three 1-D MEMS mirrors of FIG. 9 in accordance with some embodiments. The arrangement illustrated in FIG. 10 employs angles selected to maximize the usable mirror aperture.

Figure 11:
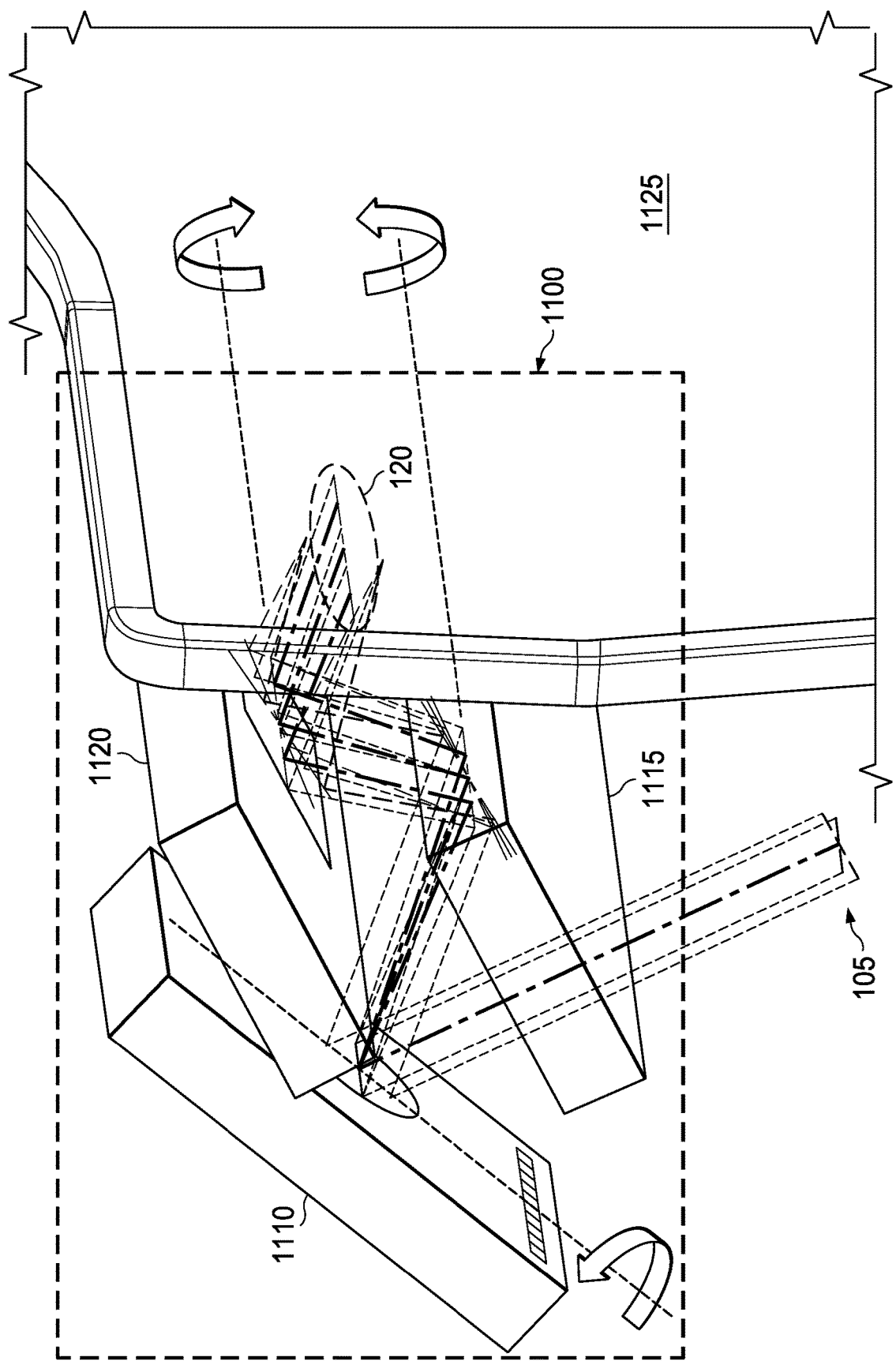
FIG. 11 is a diagram illustrating a near-eye display system including three 1-D MEMS mirrors in series to provide input angle for light to an incoupler of a waveguide independent of an optical relay in accordance with some embodiments.

FIG. 11 is a diagram illustrating a near-eye display system 1100 including three MEMS mirrors 1110, 1115, 1120 in series to provide input angles at a line to the IC 120 of a waveguide 1125 independent of an optical relay in accordance with some embodiments. The three MEMS mirrors 1110, 1115, 1120 operate similar to the three MEMS mirrors 910, 915, 920 of FIG. 9. FIG. 11 illustrates placement of the near-eye display system 1100 within an eyeglasses frame. In the illustrated example, the near-eye display system 1100 includes a first 1-D resonant MEMS mirror 1110, a second 1-D linear MEMS mirror 1115, and a third 1-D linear MEMS mirror 1120. The resonant 1-D MEMS mirror 1115 scans horizontally, resulting in a FOV that is 20 degrees along a horizontal axis and 12 degrees along a vertical axis, with an elliptical beam size that is 1.0 mm×0.6 mm. In some embodiments, the configuration of the near-eye display system illustrated in FIG. 11 is rotated 90 degrees.

Figure 12:
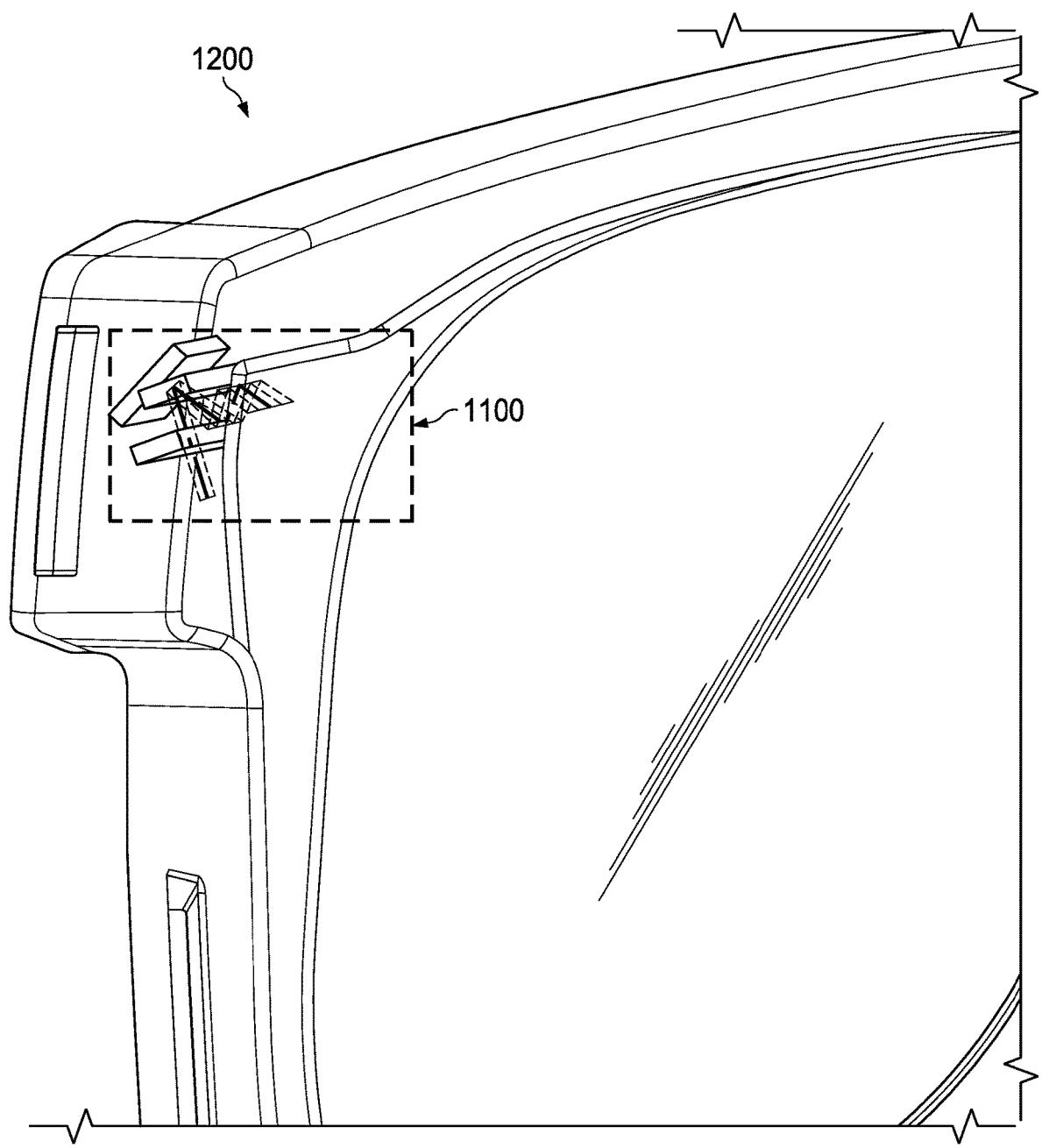
FIG. 12 is a diagram illustrating placement of the near-eye display system of FIG. 11 in an eyeglasses frame in accordance with some embodiments.

FIG. 12 is a diagram 1200 illustrating placement of the near-eye display system 1100 of FIG. 11 in an eyeglasses frame in accordance with some embodiments.

Figure 13:
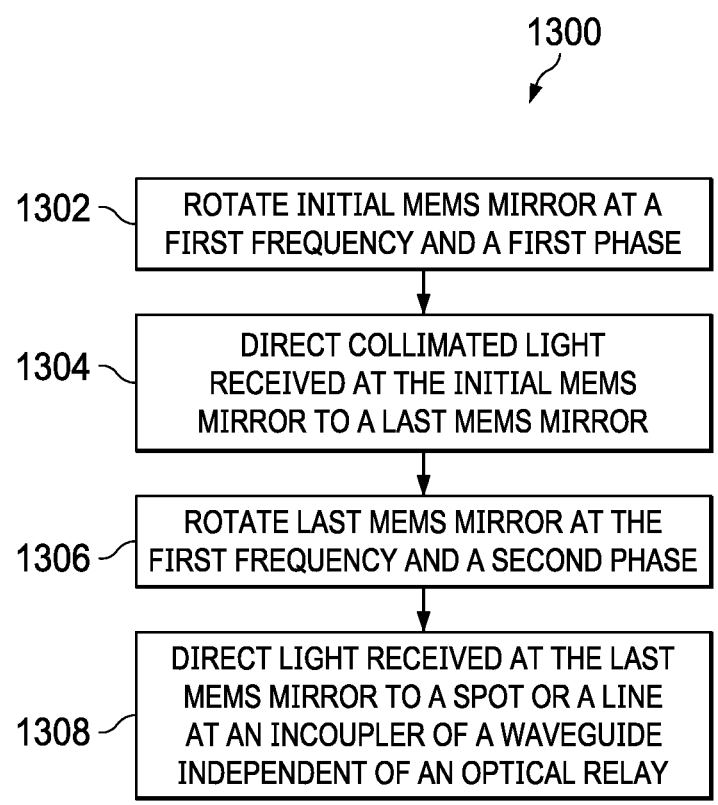
FIG. 13 is a flow diagram of a method of rotating multiple MEMS mirrors in series to direct light to a spot or a line at an incoupler of a waveguide independent of an optical relay.

FIG. 13 is a flow diagram of a method 1300 of rotating multiple MEMS mirrors in series to direct light to a spot or a line at an incoupler of a waveguide independent of an optical relay. In some embodiments, the method 1300 is implemented using the display systems illustrated in FIGS. 1, 2, and 4-12. At block 1302, an initial MEMS mirror in a series of MEMS mirrors rotates across a first range of angles at a first frequency and a first phase. In some embodiments, the initial MEMS mirror is a 2-D MEMS mirror, and in other embodiments, the initial MEMS mirror is a 1-D MEMS mirror. At block 1304, the initial MEMS mirror receives collimated light and scans the light across a range of angles corresponding to the first range of angles to a last MEMS mirror 115 in the series. In embodiments in which both the initial MEMS mirror and the last MEMS mirror are 1-D MEMS mirrors, an intermediate MEMS mirror is disposed in the light path between the initial MEMS mirror and the last MEMS mirror. In such embodiments, the intermediate MEMS mirror receives the scanned light from the initial MEMS mirror and scans the light to the last MEMS mirror.

At block 1306, the last MEMS mirror in the series rotates across a second range of angles at the first frequency and a second phase. At block 1308, the last MEMS mirror in the series receives scanned light (either from the initial MEMS mirror or from the intermediate MEMS mirror) and directs the light to a spot or a line at the IC 120 of a waveguide independent of an optical relay.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A near-eye display system comprising:
a waveguide having an incoupler (IC); and
multiple micro-electromechanical system (MEMS) mirrors in series to receive collimated light and direct the light to one or more input angles at a point or a line at the IC independent of an optical relay, wherein an initial MEMS mirror and a second MEMS mirror in the series are co-planar and the scanned light generated by the initial MEMS mirror reflects off a reflective surface of the waveguide to the second MEMS mirror.

2. The near-eye display system of claim 1, wherein
the initial MEMS mirror in the series is configured to receive the collimated light and rotate across a first range of angles at a first frequency and a first phase to scan the light along scan angles corresponding to the first range of angles; and
a last MEMS mirror in the series is configured to rotate across a second range of scan angles at the first frequency and a second phase different from the first phase to direct the scanned light to the point or the line at the IC.

3. The near-eye display system of claim 2, wherein the last MEMS mirror is larger than the initial MEMS mirror.

4. The near-eye display system of claim 2, wherein at least one of the initial MEMS mirror and the last MEMS mirror rotates about two axes.

5. A display system comprising:
a first micro-electromechanical system (MEMS) mirror to receive collimated light and rotate about a first axis to generate scanned light having a first range of scan angles; and
a second MEMS mirror in series and co-planar with the first MEMS mirror to rotate about a second axis to direct the scanned light to a spot or a line at an incoupler of a waveguide independent of an optical relay, wherein the scanned light generated by the first MEMS mirror reflects off a reflective surface of the waveguide to the second MEMS mirror.

6. The display system of claim 5, wherein the second MEMS mirror is to generate scanned light having a second range of scan angles based on the first range of scan angles.

7. The display system of claim 5, wherein
the first MEMS mirror rotates at a first frequency and a first phase; and
the second MEMS mirror rotates at the first frequency and a second phase different from the first phase.

8. The display system of claim 5, wherein the second MEMS mirror is larger than the first MEMS mirror.

9. The display system of claim 5, wherein at least one of the first MEMS mirror and the second MEMS mirror is configured to rotate about two axes.

10. A method, comprising:
directing collimated light received at an initial micro-electromechanical system (MEMS) mirror in a series of multiple MEMS mirrors comprising an initial MEMS mirror and a last MEMS mirror to a spot or a line at an incoupler of a waveguide independent of an optical relay, wherein the initial MEMS mirror and a second MEMS mirror in the series are co-planar and the scanned light generated by the initial MEMS mirror reflects off a reflective surface of the waveguide to the second MEMS mirror.

11. The method of claim 10, further comprising:
rotating the initial MEMS mirror at a first frequency and a first phase; and
rotating a last MEMS mirror at the first frequency and a second phase different from the first phase.

12. The method of claim 11, further comprising:
rotating at least one of the initial MEMS mirror and the last MEMS mirror about two axes.

* * * * *